United States Patent [19]

Hoff et al.

[11] 4,218,345

[45] Aug. 19, 1980

[54] OLEFIN POLYMERIZATION CATALYST OF CHROMIUM AND PROCESS OF PREPARING IT

[75] Inventors: Raymond E. Hoff, Palatine; Thomas J. Pullukat, Hoffman Estates, both of Ill.

[73] Assignee: Chemplex Company, Rolling Meadows, Ill.

[21] Appl. No.: 3,117

[22] Filed: Jan. 15, 1979

[51] Int. Cl.² .................... B01J 21/04; B01J 21/08; B01J 23/26

[52] U.S. Cl. .................... 252/458; 252/465; 252/468; 252/469; 526/106

[58] Field of Search ............ 252/458, 465, 468, 469; 526/106

[56] References Cited

U.S. PATENT DOCUMENTS

| | | | |
|---|---|---|---|
| 2,825,721 | 3/1958 | Hogan et al. | 526/106 |
| 3,346,511 | 10/1967 | Hill | 252/455 R |
| 3,780,011 | 12/1973 | Pullukat et al. | 252/430 X |
| 4,041,224 | 8/1977 | Hoff et al. | 252/469 X |

*Primary Examiner*—W. J. Shine
*Attorney, Agent, or Firm*—Wegner, Stellman, McCord, Wiles & Wood

[57] ABSTRACT

A catalyst, a process of preparing the catalyst and a method of making polymers and copolymers of 1-olefins with the catalyst in which the catalyst is prepared by producing finely divided particles of chromium metal by a sublimation process and dispersing the sublimate of chromium particles with an organic liquid and providing a mixture comprising the chromium sublimate particles and a support such as silica. The mixture is then heat activated in an oxidizing atmosphere. In another aspect of the invention the chromium sublimate particles and support particles are further modified by having a titanium compound as a part of the mixture of chromium sublimate particles and support particles.

48 Claims, No Drawings

OLEFIN POLYMERIZATION CATALYST OF CHROMIUM AND PROCESS OF PREPARING IT

BACKGROUND OF THE INVENTION

One of the features of this invention is to provide an improved catalyst particularly suitable for olefin polymerization in which a finely divided chromium metal sublimate is associated with particles of a support such as silica and then heat activated to produce the catalyst.

Another feature of the invention is to provide such a catalyst which is prepared from an organic liquid in which the chromium metal sublimate and support particles are dispersed.

Another feature of the invention is to provide such a mixture which also contains a titanium compound as a modifier for the chromium catalyst.

Further features include methods of making the catalyst of this invention and methods of polymerizing and copolymerizing 1-olefins with the catalyst of this invention.

SUMMARY OF THE INVENTION

Chemical chromium compounds, both organic and inorganic, have long been used as catalysts, particularly in the polymerization of olefins, and especially when associated with a carrier such as silica. The present invention provides a practical form of using chromium metal itself, which of course has zero valency, as the chromium source in a catalyst.

This invention also associates titanium compounds with the chromium easily and without difficulty. It has long been known that titanium in association with chromium compounds and used to polymerize ethylene produces a polyethylene of higher melt index or altered molecular weight distribution. The presence of the titanium in any chromium containing catalyst makes the resulting polyolefin, and especially polyethylene, suitable for applications where the resulting polyolefin is superior to that produced with a chromium compound only catalyst. Methods of incorporating titanium compounds are disclosed in prior U.S. Pat. Nos. 3,780,011 and 4,041,224 both of which are assigned to the assignee hereof.

The chromium metal of this invention is in very finely divided particle form, as it is a sublimate formed by vaporizing the chromium metal as by heating to a temperature of from about 1400°–1700° C. in a high vacuum and condensing the chromium vapors on a chilled surface in the form of extremely fine particles. At the same time, an organic liquid compound that is liquid at standard temperature and pressure, a solid at $-200°$ C., is vaporized and then condensed. The result is that the chromium atoms, in particulate form, and the organic liquid condense simultaneously on the chilled surface such as the walls of the chamber which are cooled to a low temperature such as $-195°$ C. This sublimating is continued until the bulk chromium metal has all been sublimed, or for any desired period such as when a suitable quantity of the compound and chromium particles has been collected.

The condensate, which at this temperature is in the form of a solid organic compound in most instances and sublimed particles of the chromium metal, is warmed such as by permitting it to gradually rise to room temperature. This melts the organic medium to its original liquid form. The resulting mixture comprises the chromium metal atoms sublimate dispersed in the liquid organic medium. It is usually gray in color. The chromium particles of the sublimate under these conditions are customarily of an average size of about 0.1 micron (1000 Angstrom units), but may vary from $5 \times 10^{-3}$ to 1.0 micron.

The resulting chromium sublimate is characterized by high reactivity in conjunction with the small particle size. The dispersed chromium particles may be permitted to remain in the liquid condensate, or may be separated and dispersed in a different liquid, if desired. In any event, the mixture of chromium particle sublimate and organic liquid can then be added directly to the support. The support may be of the usual type including finely divided silica, alumina, zirconia, thoria, titania, magnesia or mixtures thereof. A convenient way of mixing is to add the mixture to the finely divided support while maintaining the support as a dry fluidized bed of the type discussed in the above prior U.S. Pat. No. 3,780,011.

The chromium mixture is added to the support material, such as silica, at such a rate, which is easily observable, that essentially all of the chromium particles will be retained on the support bed and not settle, or pass on through, to the bottom. A practical example of such a rate is 0.25 cc per minute per gram of support, but can easily vary from 0.10 to 2.0 cc/minute/gram.

The resulting mixture of chromium sublimate particles and support particles is then activated at normal temperatures such as about 300°–900° C. in an oxidizing atmosphere for from 10 to 1000 minutes. This heat activating is conveniently concurrent with fluidizing the mixture in the oxidizing gas stream.

The chromium particles are made efficiently and inexpensively from the chromium metal itself without having to go through chemical preparation procedures. Also, this invention avoids the health dangers of hexavalent chromium as the catalyst source. In addition, the chromium sublimate of this invention is conveniently usable with a pure hydrocarbon such as pentane so that it is easy to maintain anhydrous conditions where such is desired.

The organic liquid is recoverable from the catalyst mixture before the catalyst is used. This recovery may be by distilling at relatively low temperatures of about 100° C. or other recovery techniques. Furthermore, during activation of the catalyst mixture, there is no evolution of reactive gases such as corrosive nitrogen oxides or acetic acid vapors.

The special features of the chromium metal sublimate particles dispersed in the organic liquid make it especially useful for preparing titanium modified chromium catalysts. Thus the mixture of chromium sublimate particles and support such as silica can be oxidized by treating with oxygen at about 500° C. This oxidation produces a dry intimate mixture of chromium trioxide and silica as described in the above U.S. Pat. No. 3,780,011. The product of this oxidation, preferably while in a fluidized state, can then be treated with a titanium compound such as a titanium ester and subsequently activated.

In addition, the mixture of chromium sublimate particles and support need not be oxidized but can be treated with the titanium compound at a drying temperature such as about 100° C. and then thermally activated. In these treatments both the chromium sublimate particles and the titanium compound can be added to a support bed such as a silica bed inside the catalyst activator after drying the mixture, which can also be done in the activator. Suitable drying conditions are by heating this mixture at from about 95°-205° C. for from 15 minutes to 2 hours. Thus the transfer steps from one piece of equipment to another, which are common in present practice, are reduced to an absolute minimum.

The preferred method of using the metal dispersion for making a titanium containing catalyst is to combine the titanium compound, such as titanium ester, with the chromium metal dispersion in the organic liquid. This combination is then added to the fluidized bed in one simple step. The combination can be formed in various ways. One way is to simply add a titanium ester, such as titanium tetraisopropoxide, to a chromium metal dispersion which has been formed in an organic liquid such as pentane, cyclohexane, toluene, or tetrahydrofuran. The mixture, with an appropriate ratio of titanium to chromium, can be pumped into the activator chamber so as to become mixed with the fluidized bed of dry support. This ratio may be from 0.1 to 10.0 moles of titanium per mole of chromium. In some cases, it may of course be desirable to separate out the organic liquid by fractional distillation.

For example, if the chromium dispersion has been made in tetrahydrofuran, after titanium tetraisopropoxide has been added, the mixture can be heated to the boiling point of tetrahydrofuran until the tetrahydrofuran is completely evaporated to leave a dispersion of chromium in titanium ester.

The presently preferred method of combining the chromium metal and the titanium compound is to employ a titanium ester as the organic liquid in the high vacuum chamber in which the metal atoms are produced by vaporization. Since an additional liquid is not needed, this direct combination is more economical.

The addition of the combination of titanium ester and chromium to a fluidized bed gives a mixture a uniform gray color. If a solvent has been used, this can easily be recovered by passing the fluidized gas through a condenser. In any case, the gray composition can then be activated in a non-reducing gas essentially as described in the above U.S. Pat. No. 3,780,011.

Other ways of depositing the chromium or chromium-titanium combinations can be by the usual solvent impregnation, dry mixing, etc.

DESCRIPTION OF THE PREFERRED EMBODIMENT

This invention comprises an improved chromium polymerization catalyst which can also include titanium as a catalyst modifier. The improvements are achieved by the use of a dispersion of chromium metal in an organic liquid prepared by cryochemical techniques.

As is normal with chromium catalysts, the amount of chromium added to the support material in the form of the dispersion can be from about 0.1 weight percent up to 10 weight percent or more by weight of the support. Usually it is preferred to have about 1.0 weight percent. The concentration of chromium in the dispersion can vary, but it is preferred for this invention that the concentration be adjusted so that in adding the desired amount of chromium the total volume of liquid added to the support does not exceed its pore volume. For example, if the support is Davison 952 grade silica, the pore volume is about 1.5 ml/g. Therefore, in preparing a catalyst with 1.0% chromium, it is desirable that the chromium concentration in the dispersion be at least 0.01 g/1.5 ml or 0.67 g/100 ml. If the pore volume is exceeded, the catalyst bed may flood and fluidization will stop.

In making titanium chromium catalysts, the preferred chromium concentration on the support is the same, and the titanium to chromium atomic ratio is preferably in the range of 1.0 to 4.5. Consequently, in preparing the novel dispersion of chromium in titanium tetraisopropoxide, an ideal concentration is 4.5 grams of chromium per 100 ml of titanium tetraisopropoxide.

Preferably, the supports are porous with large surface areas for the adsorption and/or deposition of the chromium compound with the surface areas preferably being from 50–1000 square meters per gram. Any grade of support can be used herein, but the microspheroidal intermediate density (MSID) silica is preferred. This grade has a surface area of 258 square meters per gram and a pore diameter of about 288 A., although the intermediate density (ID) silica having the same area but a pore diameter of 164 A. may be preferred in some cases. Other grades such as the G-56-ID silica and G-966 silica-alumina, as designated by the W. R. Grace Co., having surface areas of 700 and 500 square meters per gram, respectively, and pore diameters of 50–70 A. are also quite satisfactory. Variations in molecular weight control, particle size of the polymer in the particle form process, and in polymer productivity can be expected between different grades of support.

The titanium compounds may be selected from the following formulas:

$(R')_m Ti(OR')_m$,
$(R'O)_m(TiOR')_n$,
titanium acetyl acetonate compounds,
alkanolamine titanates
titanium halides in which m is 1, 2, 3, or 4, n is 0, 1, 2, or 3 and m plus n equals 4; and R is selected from alkyl aryl, cycloalkyl and alkaryl, each group having 1 to 12 carbon atoms; R' is selected from the group consisting of R, cyclopentadienyl and alkenyl, for example ethenyl, propenyl and isopropenyl, each group having 1 to 12 carbon atoms. When more than one R (or R') group occurs in the titanium compound, the groups can be the same or different. Titanium compounds represented by the formulas $(RO)_4Ti$ are preferred, particularly the alkyl compounds having from 1 to 6 carbon atoms in each alkyl group, for example tetraethyl titanate and tetraisopropyl titanate. The titanium acetyl acetonate compound can be, for example, titanium diacetylacetonate di-isopropylate, or the so-called "titanium acetyl acetonate", "titanyl acetyl acetonate". The alkanolamine titanate can be, for example, triethanolamine titanate.

The quantity of titanium compound used in the process of the present invention is suitably in the range of 0.1–8.0 wt.% based on the weight of the support material, and preferably in the range of 1.0–6.0 wt.%.

The heat activating of the catalyst mixture is at a temperature of 300°–900° C. in an oxidizing gas for a time that can be from a few minutes to several hours. The most preferable temperature range is 600°–850° C.

The improved catalysts prepared according to this invention may be used to polymerize 1-olefins of 2–8 carbon atoms and copolymers of said olefins and 1-olefins of 2–20 carbon atoms in liquid phase or vapor phase processes. These processes may be either batch or continuous. The mode of charging catalyst, olefin, and solvent if required, to the reactor system may follow any conventional practice applicable to batch or continuous operation.

Normally, agitation is provided in the reactor as well as a means to remove the heat of polymerization and a means to control the reactor temperature. In liquid phase processes, olefin polymer is normally recovered by flashing off solvent without any intervening steps for removal of the catalyst.

The activity of the catalysts described in this invention is high so that catalyst removal for practical purposes is unnecessary. Reactor conditions are dependent on the type of olefin as well as the desired polymer properties. In the case of ethylene, reactor pressures may range from 50 to 1000 psig, temperatures from 65° to 260° C. and solids levels from 5–40% by weight.

The following examples illustrate the invention:

EXAMPLE 1

An 8 gram quantity of Davison grade 952 silica was poured into a quartz tube which was one inch in diameter. The silica was retained on a fritted disc fused into the tube. Nitrogen was passed upward through the fritted disc at a rate of 300 cm$^3$/minute while the silica was heated to 260° C. This drying temperature was held for 30 minutes and then decreased to 160° C. At this temperature 10.5 ml of a dispersion of chromium metal in tetrahydrofuran was added to the fluidized bed by means of a syringe and long needle.

The dispersion had been prepared by vaporizing chromium in a high vacuum chamber into which tetrahydrofuran was also vaporized. The walls of the chamber were kept at liquid nitrogen temperature so as to condense the chromium atoms and tetrahydrofuran. Afterwards the liquid nitrogen was removed and the condensate was transferred to a glass vial and sealed without exposure to the atmosphere. The addition of the chromium dispersion caused the temperature of the bed to decrease due to the cooling effect of the tetrahydrofuran.

When the temperature returned to the set point of 160° C., the fluidized bed was a uniform gray color which shows that the metal was evenly distributed. At this point, 1.5 ml of titanium tetraisopropoxide was added to the fluidized bed also by means of a long needle and syringe. The color of the bed changed to become more tan. The nitrogen fluidizing gas was replaced with dry air at the same flow rate. An automatic programmer was used to raise the temperature gradually to 900° C. for a five hour activation period. The catalyst was cooled to 100° C., purged one hour with nitrogen, and transferred to a storage flask.

A portion of the catalyst was tested under particle form conditions in isobutane for ethylene polymerization. The quantity of catalyst employed for the test was 0.0665 g. The reaction temperature was 260° C. and the total reactor pressure was 550 psig made up of ethylene and isobutane. At the end of an hour, the yield of polyethylene was 1600 grams per gram of catalyst. The melt index according to ASTM D-1238 52T was 1.65.

EXAMPLE 2

Ten milliliters of the same metal dispersion in tetrahydrofuran were mixed under nitrogen with 1.75 ml of titanium tetraisopropoxide. The mixture was kept at room temperature for 14 minutes. It was then transferred by means of a syringe and a long needle to a fluidized bed of dry silica in a quartz tube as described in Example 1. The bed consisted of 8 grams of Davison 952 silica which had been heated with nitrogen fluidization for 20 minutes at 115° C. for drying. The color of the bed became bluish-gray when the chromium-titanium ester mixture was added to it. A temperature decrease to 60° C. took place when the metal dispersion was added.

After 5 minutes, the temperature had returned to 115° C. At this stage, the nitrogen fluidization gas was replaced with air at the same flow rate. Within one minute the color of the catalyst bed changed as the air entered it. The color became a tan-gray. The catalyst was then activated at 815° C. for five hours, cooled, purged with nitrogen, and transferred to a storage flask.

In a particle form ethylene polymerization test, the reactivity of this catalyst was found to be 1145 g/g/hr. under the same conditions as in Example 1. The melt index was 1.86 and the high load melt index was 93.6. The ratio of the high load melt index to the normal melt index was consequently 50.5.

EXAMPLE 3

A dry flask was purged with nitrogen and 1.75 ml of titanium tetraisopropoxide was introduced while maintaining the inert atmosphere. Ten milliliters of the cryochemically prepared chromium suspension in tetrahydrofuran was added and the combination was stirred for 15 minutes at room temperature. The flask was placed in a bath at 50° C. for 15 minutes and then the temperature was raised to 73° C. to evaporate the unbound tetrahydrofuran. Finally, the temperature was raised to 90° C. for ten minutes to produce a dark black slurry of chromium metal in the titanium tetraisopropoxide.

The flask was removed from the bath, and when it had cooled to room temperature, 10 ml of heptane was added to assist in the transfer. The combination of heptane, chromium and titanium ester was transferred by syringe and long needle to a fluidized bed of silica at 115° C. As in the other examples, the bed was made up of 8 grams of Davison 952 silica. It had been dried for 2 hours at 110°–115° C. under nitrogen fluidization as described in the previous examples.

When the heptane had evaporated from the bed, the color was uniform gray again showing even distribution. Under nitrogen, the temperature was raised to 150° C. The nitrogen was shut off and replaced with air. In the first 3 minutes, the gray color became lighter. Again, the catalyst was activated by a programmer. The temperature was raised to 800° C. in 8 hours and the 800° C. was held for five hours. After cooling to 100° C. and nitrogen purging, the catalyst was transferred to a storage flask.

In a polymerization test under the same conditions as described in Example 1, the reactivity of this catalyst was 1200 g/g/hr. The melt index was 1.53 and the high load melt index was 82.0 (HLMI/MI ratio=53.5).

COMPARATIVE EXAMPLE 4

A mixture of 8 grams of Davison 952 silica and 0.04 g of chromium metal was prepared in a screw cap bottle. The chromium was an electrolytic grade of 99% purity manufactured by Consolidated Astronautics, Inc., Long Island City, N.Y. The particle size was 44 microns or less. The screw cap bottle containing the mixture was repeatedly inverted and shaken for ten minutes to distribute chromium throughout the silica. The mixture was poured through a powder funnel into a quartz activator tube. It was fluidized with nitrogen at 300 cm$^3$/minute while being dried at 170° C. for twenty minutes. Titanium tetraisopropoxide in the amount of 1.75 ml was then added.

The combination was fluidized with air and then activated at 800° C. for five hours. Upon cooling, the activated catalyst was found to be almost white like the starting silica. The catalyst of Examples 1, 2 and 3 were yellow due to the presence of oxidized chromium in relatively large amount. It is believed the difference is caused by the metal settling in this case to the bottom of the bed and therefore being only poorly incorporated into the catalyst. In any case, in the polymerization test of this catalyst, the reactivity was found to be only 242 g/g/hr. under the same conditions as used in Example 1.

This catalyst was analyzed for chromium and found to contain only 0.09 weight percent. Consequently, only 18% of the chromium metal was fixed on the catalyst. The chromium content of the catalysts of Examples 1 and 2 was found to be 0.14 wt.% in each case. Based on these analyses, the reactivities of the catalyst per gram of chromium were calculated and are given below. Comparison of the reactivities shows that the catalysts made from the chromium metal dispersion have far more reactive chromium.

|  | Grams of Polyethylene/ Gram of Chromium/Hour |
| --- | --- |
| Catalyst from Metal Powder | 270,000 |
| Example 1 (Cryochemical metal dispersion) | 1,150,000 |
| Example 2 (Cryochemical metal dispersion) | 820,000 |

EXAMPLE 5

The catalyst prepared as described in Example 3 was tested in a copolymerization reaction. A 500 ml volume of isobutane was charged to a pressure vessel containing the catalyst. The temperature of the reaction vessel had been adjusted to 100° C. Ethylene and butene-1 were added simultaneously to the reaction vessel. The ethylene was added to maintain the pressure at 500 psig. Butene-1 was pumped in at a rate proportional to the ethylene flow by adjusting pump stroke at five minute intervals. Over a reaction time of an hour, 36.6 grams of butene-1 was added. At the end of an hour, the quantity of copolymer produced was 2530 grams per gram of catalyst.

EXAMPLE 6

An 8 gram quantity of Davison Grade 952 silica was heated with nitrogen fluidization at 800° C. overnight in a quartz tube. The temperature was decreased to 100° C. and 12 ml of a chromium dispersion in tetrahydrofuran was added. The mixture was heated at 150° C. for 3½ hours. It was then activated by fluidizing with air and heating to 800° C. for five hours. After cooling, the catalyst was purged with nitrogen and transferred to a storage flask. In a polymerization test at 107° C. in isobutane, the reactivity of this catalyst was found to be 1094 grams per gram per hour. The melt index of the polyethylene was 0.27 and the high load melt index was 17.2.

The apparatus used to form the chromium sublimate and organic liquid mixture may be any of those that are available for experimental purposes or commercially. Such an apparatus is available through Kontes Glass Company.

A typical apparatus is one that uses electrical resistance heating to vaporize the chromium, although obviously other methods such as electron beam guns, laser beams and electric arcs may be used if desired. The essential feature of such an apparatus is that the chromium metal is vaporized, the vapor mixed with those of an organic liquid that is in vapor form at the same temperature that the chromium metal is the vapor and that is condensible with the chromium metal to form the mixture of organic liquid and finely dispersed chromium particle sublimate. Such an apparatus, of course, is easily usable for mixing the titanium compound in the manner previously described with the sublimated organic liquid mixture.

The organic liquid can be of the types previously described because the chromium atoms in passing from the chromium solid to the chromium sublimate form are highly reactive. The preferred organic liquids are saturated hydrocarbons such as butane, pentane, hexane, and heptane, both straight-chained and branched, and simple ethers such as ethyl ether and tetrahydrofuran. Aromatic hydrocarbons such as benzene and toluene, olefins such as pentene-1, hexene-2, and heptene-3, and diolefins like 1,3-butadiene and isoprene can also be used by causing the initially formed complexes and compounds to at least partially decompose to the chromium dispersion.

With most of the liquid materials listed above there will be some chemical bonding to the chromium atoms at liquid nitrogen temperature. As the condensed matrix is warmed these complexes will decompose, and a dispersion of chromium metal in the liquid will result. The particle size, surface structure, and shape of the particles depends upon the concentration of chromium in the organic liquid and the chemical nature of the liquid.

In the metal atom reactor chamber it is necessary to prevent the molecules of organic liquid from accumulating near the hot metal source. This is done by keeping the pressure below $10^{-3}$ torr, such as from $10^{-2}$ to $10^{-5}$ torr. The pumping speed should be balanced against the volatility and rate of organic liquid addition to keep the pressure preferably between $10^{-3}$ to $10^{-4}$ torr. Too high a pumping speed decreases the yield by drawing reactants toward the pump to an excessive degree. Too low a pumping speed leads to pyrolysis of the organic liquid.

The cold wall of the metal atom reactor chamber must be kept at a temperature low enough so that the vapor pressure of the organic liquid is $10^{-3}$ torr. or less. For most of the liquids mentioned above, pentane, tetrahydrofuran, etc. a liquid nitrogen bath is most convenient. For materials of lower vapor pressure such as titanium tetraisopropoxide a Freon or liquid ammonia refrigeration system may suffice. Of course, in large scale operations adequate thermal insulation is required to conserve liquid nitrogen or refrigeration energy.

When the chromium metal dispersion is added to the fluidized bed of silica, it is best that the rate of addition be controlled so that fluidization continues across most of the bed diameter. If the bed is locally flooded, such as by a liquid plug across the top portion, it is more difficult to produce a uniform catalyst. Some of the factors which limit the maximum rate are the pore volume of the support, bed diameter, the bed temperature, the volatility of the liquid in which the chromium is dispersed, the linear gas flow rate, and the nozzle design. In any case the bed will eventually flood if the total volume of liquid added is greater than the total pore volume of the support and the rate of evaporation is low.

In practice we find that a satisfactory rate of addition is one milliliter per minute per square inch of bed area. Bed area in this case is the cross sectional area of the tube in which the support is fluidized. It is also best that during this addition the bed temperature be kept near the boiling point of the organic liquid.

If the chromium is dispersed in titanium tetraisopropoxide rather than a simple organic liquid, other relationships need to be considered. It is desirable that the chromium content of the finished catalyst be about one percent. At the same time the titanium to chromium atomic ratio should be from 3.5 to 4.5. This means that the titanium content of the catalyst will be from about 1.0 to 4.5%. The density of the titanium ester is 0.94 g/ml. Under these restraints the total liquid volume will only be a small fraction of the total pore volume of the commonly used silicas. The chromium dispersion in the titanium ester can be added to the fluidized bed at any convenient temperature. The temperature at which the bed is dried, about 100°–200° C., is an ideal temperature.

It is well known that in catalysts of this type the optimum chromium content is about 1% even though lower and higher can be used. Also, generally 5% titanium is desired. A dispersion which contains 4.5 grams chromium per 100 ml of titanium ester is therefore ideal. However, dispersions of lower concentration are more stable and may be preferred in some catalyst preparations.

When the liquid of the chromium dispersion is pentane, benzene, tetrahydrofuran, etc., the concentration of chromium is not so restricted. If the concentration is low, a larger volume can be added allowing, of course, for fluidization and evaporation as described above. Naturally, it is preferred that the concentration be as high as possible to minimize solvent recovery.

Having described our invention as related to the embodiments set out herein, it is our intention that the invention be not limited by any of the details of description, unless otherwise specified, but rather be construed broadly within its spirit and scope as set out in the appended claims.

We claim:

1. A dispersion of reactive chromium particles on a support, useful for making an olefin polymerization catalyst by heat activating in an oxidizing gas, prepared by the process of (1) forming a sublimate of chromium metal particles by subliming chromium metal under high vacuum conditions while adding an organic liquid and condensing said chromium and organic liquid on a cold surface that is at a temperature such that the vapor pressure of the organic liquid is $10^{-3}$ torr or less, (2) forming a mixture of said sublimate particles and organic liquid and a finely divided, difficultly reducible support selected from the group consisting of silica, alumina, zirconia, thoria, titania, magnesia and mixtures thereof, (3) heat activating the mixture of (2) in an oxidizing gas atmosphere, and (4) separating the organic liquid by evaporation.

2. The dispersion of claim 1 wherein the sublimate of (1) is formed by vaporizing chromium metal into a chamber under high vacuum conditions by heating the chromium to a temperature such that its equilibrium vapor pressure is between $10^{-5}$ and $10^{-2}$ torr while adding to the chamber an organic liquid and condensing the chromium and organic liquid into a cold surface while maintaining said high vacuum.

3. The dispersion of claim 2 wherein said chromium sublimate is formed simultaneously with vaporizing and then condensing on said cooled surface said organic liquid.

4. The dispersion of claim 1 wherein said sublimate of (1) is formed simultaneously with vaporizing and then condensing an organic liquid in the presence of said sublimate to produce chromium sublimate particles dispersed in said liquid.

5. The dispersion of claim 4 wherein said organic liquid is chilled to a solid on said cooled surface followed by melting the solid to reconstitute the liquid with said chromium particles dispersed therein.

6. The dispersion of claim 1 wherein said mixture of (2) is formed by adding the chromium particles of (1) to the support while fluidizing with an atmosphere of inert gas.

7. The dispersion of claim 6 wherein the chromium particles sublimate of (1) is formed by vaporizing bulk chromium metal into a chamber under high vacuum conditions by heating the chromium to a temperature of from 1400° to 1700° C. and condensing the chromium vapor on said solid surface while maintaining said high vacuum.

8. The dispersion of claim 7 wherein said chromium sublimate is formed simultaneously with vaporizing and then condensing on said cooled surface an organic liquid.

9. The dispersion of claim 6 wherein said sublimate of (1) is formed simultaneously with vaporizing and then condensing an organic liquid in the presence of said sublimate to produce chromium particles dispersed in said liquid.

10. The dispersion of claim 9 wherein said organic liquid is chilled to a solid on said cooled surface followed by melting the solid to reconstitute the liquid with said dispersed chromium particles therein.

11. A dispersion of reactive chromium particles on a support, useful for making an olefin polymerization catalyst by heat activating in an oxidizing gas, prepared by the process of (1) forming a sublimate of chromium metal particles mixed with an organic liquid by subliming chromium metal under high vacuum conditions while adding an organic liquid and condensing said chromium and organic liquid on a cold surface that is at a temperature such that the vapor pressure of the organic liquid is $10^{-3}$ torr or less, (2) forming a mixture of said sublimate particles and organic liquid and a finely divided, difficultly reducible support selected from the group consisting of silica, alumina, zirconia, thoria, titania, magnesia and mixtures thereof, (3) adding a titanium compound to the mixture of (2), (4) heat activating the mixture of (3) in an oxidizing gas atmosphere, and (5) separating the organic liquid by evaporation.

12. The dispersion of claim 11 wherein the sublimate of (1) is formed by vaporizing chromium metal into a chamber under high vacuum conditions by heating the chromium to a temperature of from 1400° to 1700° C. while adding to the chamber an organic liquid and condensing the chromium and organic liquid on a cold surface while maintaining said high vacuum.

13. The dispersion of claim 11 wherein said chromium sublimate is formed simultaneously with vaporizing and then condensing on said cooled surface an organic liquid.

14. The dispersion of claim 11 wherein said sublimate of (1) is formed simultaneously with vaporizing and then condensing an organic liquid in the presence of said sublimate to produce chromium dispersed in said liquid.

15. The dispersion of claim 14 wherein said organic liquid is chilled to a solid on said cooled surface followed by melting the solid to reconstitute the liquid with said chromium particles dispersed therein.

16. The dispersion of claim 11 wherein said mixture of (2) is formed by adding the chromium particles of (1) to the support while fluidizing with an atmosphere of inert gas such as nitrogen.

17. The dispersion of claim 16 wherein the chromium particles sublimate of (1) is formed by vaporizing the bulk chromium metal into a chamber under high vacuum conditions by heating the chromium to a temperature of from 1400° to 1700° C. and condensing the chromium vapor on said cold surface while maintaining said high vacuum.

18. The dispersion of claim 17 wherein said chromium sublimate is formed simultaneously with vaporizing and then condensing on said cooled surface an organic liquid.

19. The dispersion of claim 16 wherein said sublimate of (1) is formed simultaneously with vaporizing and then condensing an organic liquid in the presence of said sublimate to produce chromium dispersed in said liquid.

20. The dispersion of claim 19 wherein said organic liquid is chilled to a solid on said cooled surface followed by melting the solid to reconstitute the liquid with said dispersed chromium particles therein.

21. The dispersion of claim 1 wherein said chromium is present in an amount to give about 0.1–10 wt.% chromium.

22. The dispersion of claim 11 wherein said titanium compound is present in an amount to produce about 0.1–8.0 wt.% titanium based on the weight of said support.

23. The dispersion of claim 1 wherein the mixture of (2) is dried at from about 95°–205° C. for from about 15 minutes to two hours.

24. The process of preparing an active polymerizing catalyst, comprising: (1) forming a sublimate of chromium metal particles mixed with an organic liquid by subliming chromium metal under high vacuum conditions while adding to the vacuum chamber an organic liquid and condensing said chromium and organic liquid on a cold surface that is at a temperature such that the vapor pressure of the organic liquid is $10^{-3}$ torr or less, (2) forming a mixture of said sublimate particles and a finely divided, difficultly reducible support selected from the group consisting of silica, alumina, zirconia, thoria, titania, magnesia and mixtures thereof, and (3) heat activating the mixture of (2) in an oxidizing gas atmosphere.

25. The process of claim 24 wherein the sublimate of (1) is formed by vaporizing chromium metal into a chamber under high vacuum conditions by heating the chromium to a temperature such that its equilibrium vapor pressure is between $10^{-5}$ and $10^{-2}$ torr while adding to the chamber an organic liquid and condensing the chromium and organic liquid onto a cold surface while maintaining said high vacuum.

26. The process of claim 25 wherein said chromium sublimate is formed simultaneously with vaporizing and then condensing on said cooled surface said organic liquid.

27. The process of claim 24 wherein said sublimate of (1) is formed simultaneously with vaporizing and then condensing an organic liquid in the presence of said sublimate to produce chromium sublimate particles dispersed in said liquid.

28. The process of claim 27 wherein said organic liquid is chilled to a solid on said cooled surface followed by melting the solid to reconstitute the liquid with said chromium particles dispersed therein.

29. The process of claim 24 wherein said mixture of (2) is formed by adding the chromium particles of (1) to the support while fluidizing with an atmosphere of inert gas.

30. The process of claim 29 wherein the chromium particles sublimate of (1) is formed by vaporizing bulk chromium metal into a chamber under high vacuum conditions by heating th chromium to a temperature of from 1400° to 1700° C. and condensing the chromium vapor on said solid surface while maintaining said high vacuum.

31. The process of claim 30 wherein said chromium sublimate is formed simultaneously with vaporizing and then condensing on said cooled surface an organic liquid.

32. The process of claim 29 wherein said sublimate of (1) is formed simultaneously with vaporizing and then condensing an organic liquid in the presence of said sublimate to produce chromium particles dispersed in said liquid.

33. The process of claim 32 wherein said organic liquid is chilled to a solid on said cooled surface followed by melting the solid to reconstitute the liquid with said dispersed chromium particles therein.

34. The process of preparing an active polymerizing catalyst, comprising: (1) forming a sublimate of chromium metal particles mixed with an organic liquid by subliming chromium metal under high vacuum conditions while adding an organic liquid and condensing said chromium and organic liquid on a cold surface that is at a temperature such that the vapor pressure of the organic liquid is $10^{-3}$ torr or less, (2) forming a mixture of said sublimate particles and organic liquid and a finely divided, difficultly reducible support selected from the group consisting of silica, alumina, zirconia, thoria, titania, magnesia and mixtures thereof, (3) adding a titanium compound to the mixture of (2), and heat activating the mixture of (3) in an oxidizing gas atmosphere.

35. The process of claim 34 wherein the sublimate of (1) is formed by vaporizing chromium metal into a chamber under high vacuum conditions by heating the chromium to a temperature of from 1400° to 1700° C. while adding to the chamber an organic liquid and condensing the chromium and organic liquid on a cold surface while maintaining said high vacuum.

36. The process of claim 34 wherein said chromium sublimate is formed simultaneously with vaporizing and then condensing on said cooled surface an organic liquid.

37. The process of claim 34 wherein said sublimate of (1) is formed simultaneously with vaporizing and then condensing an organic liquid in the presence of said sublimate to produce chromium dispersed in said liquid.

38. The process of claim 37 wherein said organic liquid is chilled to a solid on said cooled surface followed by melting the solid to reconstitute the liquid with said chromium particles dispersed therein.

39. The process of claim 34 wherein said mixture of (2) is formed by adding the chromium particles of (1) to the support while fluidizing with an atmosphere of inert gas such as nitrogen.

40. The process of claim 39 wherein the chromium particles sublimate of (1) is formed by vaporizing the bulk chromium metal into a chamber under high vacuum conditions by heating the chromium to a temperature of from 1400° to 1700° C. and condensing the chromium vapor on said cold surface while maintaining said high vacuum.

41. The process of claim 40 wherein said chromium sublimate is formed simultaneously with vaporizing and then condensing on said cooled surface an organic liquid.

42. The process of claim 39 wherein said sublimate of (1) is formed simultaneously with vaporizing and then condensing an organic liquid in the presence of said sublimate to produce chromium dispersed in said liquid.

43. The process of claim 42 wherein said organic liquid is chilled to a solid on said cooled surface followed by melting the solid to reconstitute the liquid with said dispersed chromium particles therein.

44. The process of claim 24 wherein said chromium is present in an amount to give about 0.1–10 wt.% chromium.

45. The process of claim 34 wherein said titanium compound is present in an amount to produce about 0.1–8.0 wt.% titanium based on the weight of said support.

46. The process of claim 24 wherein said gas comprises air.

47. The process of claim 24 wherein the mixture of (2) is dried at from about 95°–205° C. for from about 15 minutes to two hours.

48. The process of claim 34 wherein the sublimate of (1) is formed by vaporizing chromium metal into a chamber under high vacuum conditions by heating the chromium to a temperature such that its equilibrium vapor pressure is between $10^{-5}$ and $10^{-2}$ torr while adding to the chamber an organic liquid and condensing the chromium and organic liquid on a cold surface while maintaining said high vacuum.

* * * * *